CATHODE RAY SYSTEM FOR VIEWING TRANSPARENCIES

Filed Feb. 25, 1966 2 Sheets-Sheet 1

INVENTOR
CLAYTON D. ALWAY
BY
Robert E. Wadhams
ATTORNEY

Oct. 14, 1969 C. D. ALWAY 3,472,952

CATHODE RAY SYSTEM FOR VIEWING TRANSPARENCIES

Filed Feb. 25, 1966 2 Sheets-Sheet 2

INVENTOR
CLAYTON D. ALWAY
BY
Robert E. Windham
ATTORNEY

United States Patent Office 3,472,952

Patented Oct. 14, 1969

3,472,952

CATHODE RAY SYSTEM FOR VIEWING TRANSPARENCIES

Clayton D. Alway, Portage, Mich., assignor to The Upjohn Company, Kalamazoo, Mich., a corporation of Delaware Filed Feb. 25, 1966, Ser. No. 530,013
Int. Cl. H04n 3/10
U.S. Cl. 178—6.8 4 Claims

ABSTRACT OF THE DISCLOSURE

Apparatus for producing a display image of a transparency by generating a light spot on a surface and focusing the light emanating from the spot onto the transparency and causing the light effected by the transparency to be focused on the cathode of the photomultiplier tube so that the photomultiplier tube will detect the aforesaid light for producing a signal to vary the intensity of the light spot on the surface as a function of the light intensity striking the cathode of the photomultiplier tube.

This invention relates to apparatus for producing an image on a cathode ray tube or the like and more particularly relates to an apparatus for scanning a negative transparency with the travelling light spot of a cathode ray tube or the like to produce a positive display of the image of the negative transparency on the same cathode ray tube.

A wide variety of applications exists for apparatus capable of producing a scanned display of a photographic transparency or small object particularly wherein a positive image of a photographic negative can be displayed and where various parameters of the display such as brightness, contrast, magnification and so forth can be readily adjusted. For example, there is substantial demand by photographers, both professional and amateur, for apparatus by means of which negatives can be viewed as positives without going through the usual photographic printing process.

Prior known devices capable of performing this task in general have not been compeltely satisfactory for a variety of reasons. For example, one known device utilizes a television camera to scan a negative transparency mounted on a light box, the output of the camera feeding a closed circuit television receiver through a wired connection. Such apparatus is chiefly disadvantageous in that the closed circuit television camera and receiver used are relatively expensive compared to typical commercial television broadcast receivers of the type widely found in private homes.

Another prior device has utilized a so-called flying spot camera consisting of a special kinescope having extremely short persistence phosphors in which the moving spot of light generated on the screen of the tube by a scanning electron beam therewithin is focused through a lens system upon a slide or transparency. The light beam passing through the transparency is modulated as a function of density of the transparency image and then is focused on a photomultiplier tube. The output of the photomultiplier drives a further cathode ray tube of, for example, the type found in a closed circuit television receiver. This arrangement is expensive and requires special parts, e.g., the ultra short persistence phosphor kinescope, not in wide use. It should be noted that use of a conventional television receiver cathode ray tube in place of the special short persistence phosphor kinescope would result in an unacceptable smearing of the picture produced by such a system because conventional television cathode ray tubes have relatively long persistence phosphors.

Accordingly, it is an object of this invention to provide an apparatus for scanning a transparency with a moving light spot generated by a cathode ray tube or the like and for producing an image on the same cathode ray tube screen corresponding to the image on the transparency.

A further object of this invention is to provide an apparatus, as aforesaid, which is particularly, adapted to use with cathode ray tubes of the type found in home television receivers and, more specifically, which is capable of using a cathode ray tube having relatively long persistence phosphors and, thus, does not require a cathode ray tube having short persistence phosphors for satisfactory operation.

A further object of this invention is to provide an apparatus, as aforesaid, which requires few components, which components are readily and widely available and are relatively inexpensive.

A further object of this invention is to provide an apparatus, as aforesaid, which may be assembled from a home televsion receiver and a slide projector modified by replacing the lamp thereof with a photomultiplier tube, the transparency to be scanned being located at the normal location of a slide in a slide projector and the output of photo tube being supplied to the television set to modulate the intensity of the electron beam of the cathode ray tube.

A further object of this invention is to provide an apparatus, as aforesaid, which can be readily assembled from presently available components adaptable to such use with only minor modifications thereof by the user given suitable directions and tools or by a television receiver repairman at low cost, in which the modifications required in the major components may be readily included at the time of initial manufacturing with little increase in cost or which may be produced as a complete system at little or no increase in cost over the corresponding new price of a comparable television receiver and slide projector bought separately.

A further object of this invention is to provide an apparatus, as aforesaid, actuable to reverse the light and dark tones of the negative image for producing a positive display from a negative transparency and in which such actuation automatically compensates for undesirable effects resulting from the use of a long persistence phosphor cathode ray tube.

A further object of this invention is to provide an apparatus, as aforesaid, which is readily modified to produce a high contrast display from a low contrast transparency image.

A further object of this invention is to provide an apparatus, as aforesaid, to which may be connected to additional television sets in parallel with the initial cathode ray device without modification of the original apparatus.

A further object of this invention is to provide an apparatus, as aforesaid, in which the operation is independent of the type of scanning used and which can be used with a normal horizontal scan or with a variety of other scanning patterns including random scanning, sinusoidal scanning, Lisajous pattern scanning and so forth.

A further object of this invention is to provide an apparatus, as aforesaid, which does not affect the ability of a television receiver and slide projector incorporated therein to readily be returned to their original usage.

A further object of this invention is to provide apparatus which can be readily serviced and maintained by television receiver repair personnel.

Other objects and purposes of this invention will be apparent to persons acquainted with apparatus of this general type upon reading the following specification and inspecting the accompanying drawings:

Figure 3:
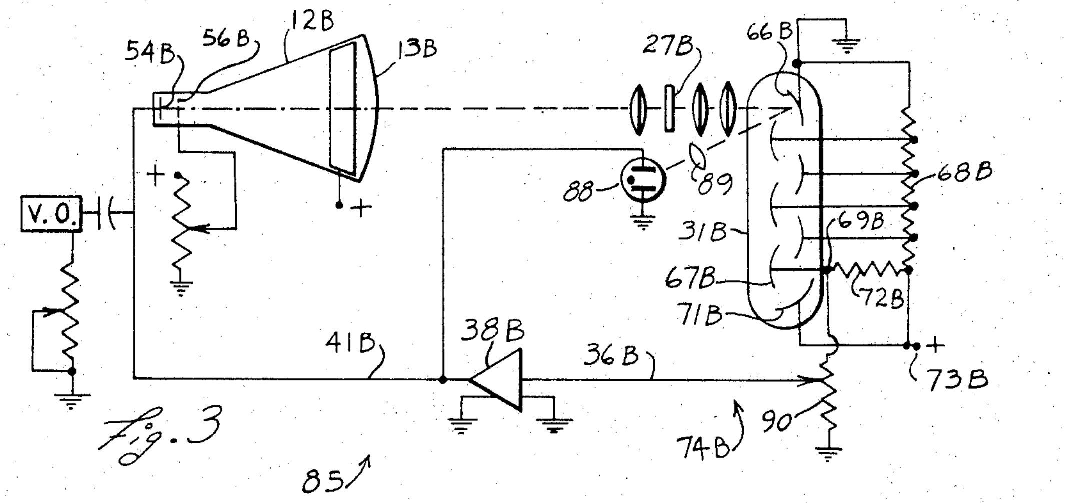

FIGURE 3 discloses a further modification.

Figure 4:
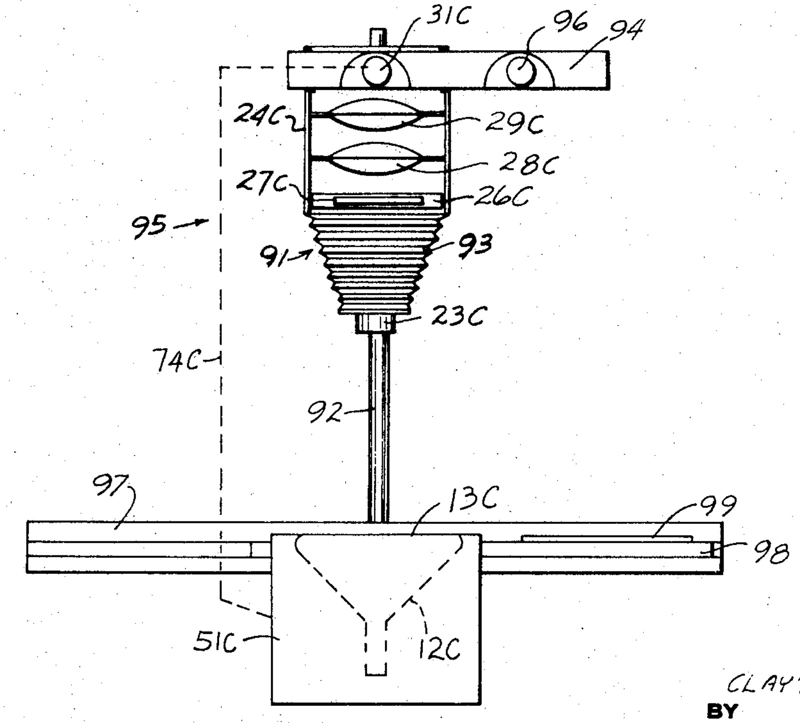

FIGURE 4 discloses a still further modification.

GENERAL DESCRIPTION

In general, the objects and purposes of this invention are met by providing an apparatus for producing an image display from a specimen, such as an image-bearing transparency. The apparatus includes a surface opposed to and spaced from the specimen, means for generating a light spot on a surface, means for scanning the light spot across the surface and means for controlling the intensity of the light spot. An objective lens is disposed between the specimen and the scanned surface for focusing the moving light spot on the specimen so that the specimen is scanned thereby. A photoelectric device is provided to sense the intensity of the light after it has struck the specimen. In the preferred embodiment of the invention, the apparatus is intended to detect the light transmitted by a transparency. The amount of light reaching the photoelectric device is preferably increased by locating a condenser lens system between the specimen and the photoelectric device focused on the latter. The output of the photoelectric device is connected to the means controlling the intensity of the light spot so that the intensity of the light spot on the surface varies as a funcion of the intensity of the light striking the photoelectric means.

DETAILED DESCRIPTION

Figure 1:
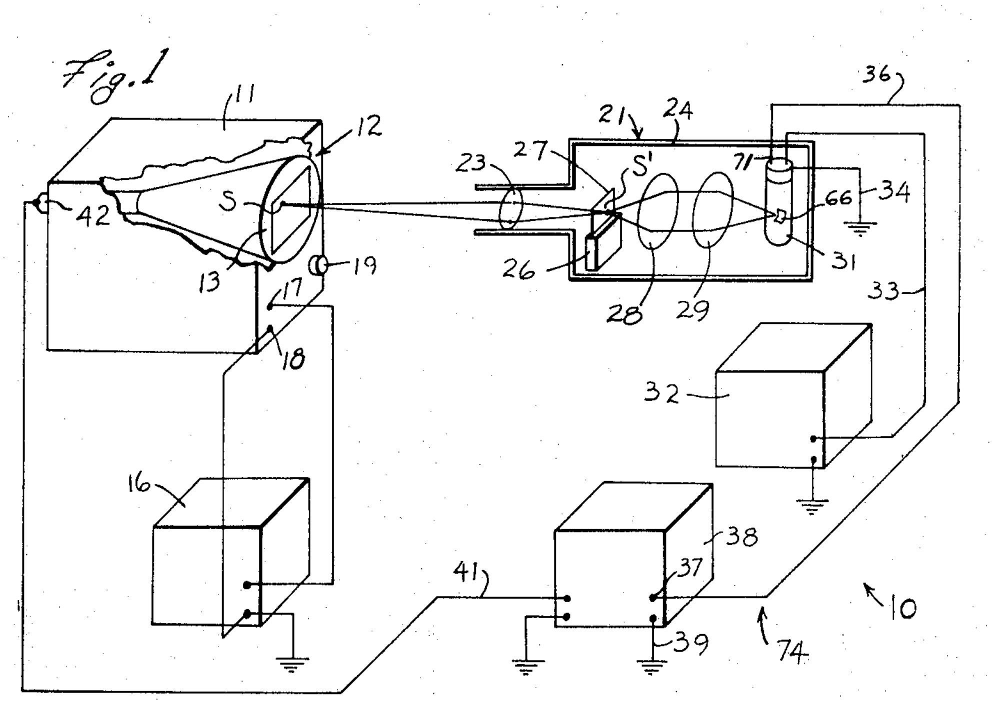
FIGURE 1 is a diagrammatic view of apparatus embodying the present invention.

FIGURE 1 illustrates schematically apparatus 10 embodying the invention. The apparatus 10 shown may be particularly advantageous for using or demonstrating the effect of the invention where conventional electronic test equipment is readily available. The apparatus 10 includes a display device, here a conventional laboratory oscilloscope 11 having a cathode ray tube 12. A phosphor coated screen 13 defines the rightward end of the tube 12. A bright light spot S will be produced on the screen 12 when such screen is struck by the electron beam of the cathode ray tube. A signal generator 16, preferably capable of generating a sawtooth voltage, is connected to the vertical input terminals 17 and 18 of the iscilloscope 11 in a conventional manner for triggering the vertical sweep of the electron beam of the cathode ray tube 12 and, hence, causing vertical movement of the light spot. Depending on the oscilloscope used, the generator 16 may be an external one as shown or a part of the oscilloscope circuitry. Although a sawtooth wave form is preferred, the output of the generator 16 may be of triangular, sinusoidal or of any other of a variety of wave forms. The horizontal sweep frequency of the electron beam and, hence, the horizontal light spot movement on the screen 13 is set by the horizontal sweep control 19 normally found on oscilloscopes. Although a wide variety of horizontal and vertical sweep frequencies may be employed, a 20 cycle per second vertical sweep frequency and a 5000 cycle per second horizontal sweep frequency have been successfully used. Depending on the vertical and horizontal sweep frequencies and wave form employed, it is contemplated that a wide variety of different raster patterns including Lisajous patterns, may be employed without materially influencing the effect which the apparatus 10 is to achieve, as long as the display area of the screen is closely and more or less uniformly swept by the electron beam.

A spot sensing device 21 is spaced in front of the screen 13 and includes an objective lens 23 preferably coaxially aligned with the cathode ray tube 12. The objective lens 23 is preferably mounted for axial movement with respect to the housing 24 of the device 21 for focusing purposes. A mount 26 of any convenient type is carried by the housing 24 for supporting a specimen 27, normally a photographic transparency. The transparency 27 is mounted transversely of the axis of the objective lens 23. Thus, axial adjustment of the lens 23 will focus the moving spot of light on the cathode ray screen 13 on the specimen 27. Condenser lenses 28 and 29 are here mounted coaxially of the objective lens 23 behind the transparency 27. A photoelectric device 31, preferably a conventional photomultiplier tube, is mounted on the housing 24 behind the condenser lenses 28 and 29. The condenser lenses focus the portion of the light spot focused on the specimen 27 which is transmitted therethrough or therepast onto the cathode 66 of the photomultiplier 31.

The anode and dynodes, not shown, of the photomultiplier tube 31 are supplied with power from a high voltage supply 32 in a conventional manner through a line 33 and the photomultiplier cathode is preferably grounded at 34.

The output of the photomultiplier tube 31, taken for example from the anode thereof, is applied to a line 36. Alternative circuitry for supplying power to the photomultiplier and for taking an output signal therefrom are disclosed in detail below with respect to FIGURES 2 and 3. The line 36 is connected to the ungrounded input 37 of an amplifier 38, the other side of the amplifier input being grounded as indicated at 39. The amplifier 38 may be of any convenient type capable of relatively flat response over the relatively wide range of frequencies fed thereto by the photo tube 31 and may be a conventional video amplifier. Further, the amplifier 38 provides D.C. isolation between the photomultiplier and oscilloscope. The output of the amplifier is fed through line 41 to the intensity modulation terminal 42 of the oscilloscope 11. The voltage appearing at the terminal 42 modulates the intensity of the electron beam within the cathode ray tube 12 and, hence, modulates the intensity of the light spot S which is swept to produce the raster on the screen 13. Thus, the photomultiplier and amplifier can be considered a feedback path 74 to the oscilloscope controlled by the specimen 27 being scanned.

In the particular embodiment shown, the oscilloscope used was a Tektronics model 545, the amplifier 38 was one section of a type "O" amplifier in the oscilloscope and the photomultiplier tube was a type 931A. Also in the particular embodiment shown, the spot sensing device 21 was a conventional slide projector arranged to receive a photographic negative 27 in place of the usual slide and modified by replacement of the projector lamp with the photomultiplier 31 at the focus of the condenser lenses 28 and 29.

OPERATION

Briefly, the light spot S is caused to move across the screen 13 to form the raster thereon. The moving light spot S is focused by the objective lens 23 on the transparency 27 so that a focused spot of light S′ moves across and repeatedly covers the leftward face of the transparency 27 in a manner corresponding to the movement of the spot S across the screen 13. Little light will be transmitted through the transparency 27 as the spot S′ scans a dense portion thereof whereas most of the light focused at the spot S′ will be transmitted through the transparency 27 when a clear area is scanned. The light transmitted by the transparency 27 falls on the cathode 66 of the photomultiplier tube 31 and, in the particular embodiment shown, the intensity of such light is increased by the condenser lenses 28 and 29. The photomultiplier tube 31 reacts in a well-known way to the incidence of light upon the cathode thereof by producing a corresponding change in voltage on the line 36.

The signal appearing on the line 36 is amplified by amplifier 38 and is imposed on the terminal 42 of the oscilloscope 11 to modulate the electron beam intensity of the cathode ray tube 12. In the embodiment of FIGURE 1, the photomultiplier 31, amplifier 38 and oscilloscope 11 are interconnected so that an increase in the amount of light transmitted by the transparency 11 results in a darkening of the spot S on the screen 13 and vice versa. Thus, an image is produced on the screen 13 corresponding to the image on the transparency with clear areas of the transparency appearing dark on the screen 13 and dense areas of the transparency appearing light on the screen 13. In short, therefore, when the transparency 27 is a conventional photographic negative, the image produced on the screen 13 will be a positive one, corresponding to a conventional positive photographic print made from such negative transparency.

Therefore, the feedback path 74 here functions as a negative or inverse feedback path which for each point on the transparency scanned causes a set amount of light to fall on the photomultiplier tube. The intensity range of light falling on the photomultiplier is substantially smaller than the intensity range of the screen spot S as a result of the negative feedback through the path 74, since any change in intensity of the light striking the photomultiplier causes the feedback path 74 to readjust the brightness of the spot S on the screen in a direction to minimize such change. Because of the inverse nature of the feedback, the screen 13 can be of the type using long persistence phosphors without losing good picture quality as hereinafter described.

An electron beam scanning a long persistence phosphor screen produces a moving, bright circular area where the beam strikes the screen, followed by a relatively long "tail" or trailing light smear of diminishing intensity produced by the long persistence of phosphors which the electron beam has struck and passed beyond. In prior flying spot devices extremely short persistence phosphors have been required in order to limit the length of the moving light spot substantially to its stationary length, i.e., eliminate any trailing "tail" of light from the spot, since use of moving light spot having an extended tail has in prior flying spot devices produced display images in which the boundaries between adjacent light and dark areas are not clear cut but rather are smeared to an unacceptable extent. The cause of this effect is readily seen and is described immediately hereinbelow.

In using a constant intensity light spot having a tail to scan a negative transparency, the level of light transmitted by the transparency rises rapidly to an intermediate value as the head of the scanning spot passes from a dark to a clear transparency area. As the spot moves further into the clear area its tail moves gradually into the clear area so that the transmitted light intensity gradually rises from the intermediate value to a maximum, the maximum occurring when the entire length of the light smear is focused on the clear area of the negative. On the other hand, as the leading portion of the elongated spot passes from the clear area to a further dark area, the transmitted light drops sharply to an intermediate value and then diminishes more slowly as the extended tail of the travelling light smear passes gradually out of the clear area. The output of a photo tube energized by the light so transmitted would not be a square pulse such as a point light spot would produce but rather would be a distorted square pulse in which the ends of the rise and fall traces are rounded and the rise and fall times are greatly increased.

Should such a distorted pulse be used to control the electron beam intensity of a further cathode ray tube, the light intensity of the flying spot source being held constant, a smeared image will appear on the screen of the further cathode ray tube. This can be readily understood by assuming, for purposes of illustration, that the pulse is of a polarity intended to produce a dark area on the screen corresponding to the clear transparency area. The initial rapid rise in the pulse will cause a rapid darkening of the screen spot to an intermediate value. The slow cresting of the pulse amplitude then causes a gradual further darkening of the scanning screen spot to a final value. Similarly, as the pulse amplitude drops, the screen image grows brighter, first rapidly and then more slowly.

The result, instead of a clear cut dark area of the screen, is a dark area separated from surrounding light areas by wide zones of intermediate brightness, i.e., a smeared image. This effect has been noted in prior flying spot devices when a long persistence kinescope is used as the flying spot source.

Returning now to the operation of the apparatus 10, the negative feedback path 74 and its control of the intensity of the spot S eliminates, for all practical purposes, the undesirable smearing effect, above described, of long persistence phosphors used as a flying spot source. In the apparatus 10, when the moving elongated light spot scans from a dark to a clear area of the transparency 27 the photomultiplier 31 upon detecting the first increase in transmitted light intensity darkens the light spot S on the screen 13 through the negative feedback path 74. Since the head of the spot S on the screen 13 is now near the dark end of its range of brightness, the range of gradual darkening that a particular location on the screen undergoes as the head of the now darkened spot moves therebeyond is insignificant compared to the total range of brightness of the spot S. Thus, the tail formed by movement of the darkened spot S does not add significantly to the light impinging on the phototube and a sharply defined boundary exists between the light area and the newly formed dark area on the screen 13. On the other hand, when the head of the darkened spot S′ moves from a clear area to a dark area of the transparency 27A, the darkened tail of the spot S′ remaining in the clear area furnishes relatively little light to the photomultiplier tube. Since it is dark, the tail does not slow the rapid brightening of the head of the spot S as it scans from negative clear area to negative dark area.

The use of inverse feedback also stabilizes the apparatus and makes various adjustments of voltage much less critical than in conventional flying spot scanners.

The size of the image appearing on the screen 13 may be enlarged or reduced simply by moving the projector 21 toward or away therefrom, respectively, and refocusing the lens 23 to insure that the spot S′ is focused on the specimen 27. This is most easily carried out simply by adjusting the focus of the objective lens 23 until the clearest picture is obtained on the screen 13.

Figure 2:
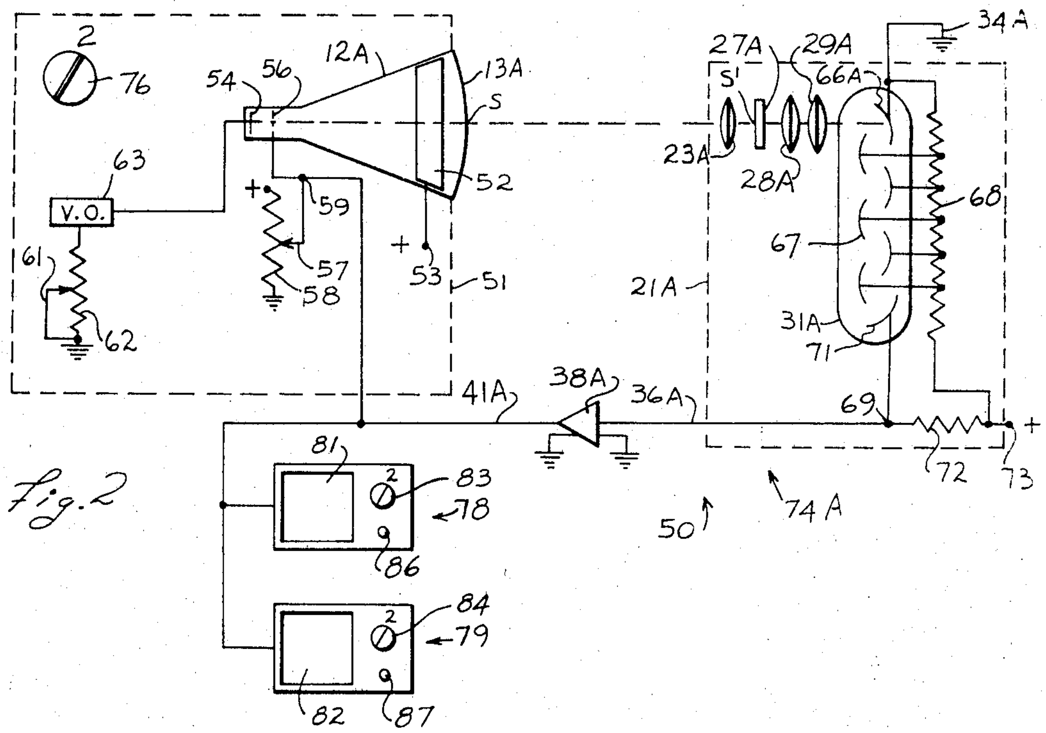
FIGURE 2 is a diagrammatic view of apparatus embodying the invention and disclosing a modification.

Modification of FIGURE 2

FIGURE 2 discloses schematically a further apparatus 50 embodying the invention. The apparatus 50 differs chiefly from the apparatus 10 above described in that the display device 51 thereof preferably comprises a conventional television receiver of the type widely used for receiving commercial television broadcasts. However, except where otherwise stated hereinbelow, a display device other than a broadcast receiver may be used, including for example, a closed circuit television receiver or a cathode ray tube equipped circuit constructed especially to carry out the present invention by eliminating the extra components of a broadcast receiver. In the following description parts of the apparatus 50 corresponding to parts of the apparatus 10 will be designated by the same reference numerals thereas with the suffix A added thereto.

Inasmuch as the television receiver 51 may be any conventional receiver and since a wide number of variations in conventional receiver circuitry exist, the circuitry of the televison receiver 51 will not be shown in detail except to illustrate the connection of the remainder of the apparatus 50 thereto. Thus, it will be sufficient to note that the high voltage electrode 52 of the picture tube 12A is energized from junction point 53 of the high voltage supply, not shown, of the set 51. Although connection may be made to the cathode 54 and control grid 56 of the picture tube 12A within the receiver 51 in a variety of ways for producing a picture in a conventional manner on the screen 13A, one well-known particular arrangement will be shown for purposes of illustration only. More particularly, in the illustrated arrangement, the control grid 56 is connected through a junction point 59 to the slide 57 of a potentiometer 58 used as the brightness control of the set 51, movement of the slider 57 along the resistance element of the potentiometer 58 varying the voltage applied to the control grid 56 and, hence, the intensity of the beam of electrons exiting from the cathode 54 and impinging upon the screen 13A. The cathode 54 connects to the video output portion 63 of the set 51. One end of a grounded potentiometer 62 connected to the slider 61 of the potentiometer 62 is movable to adjust the output voltage of the video output portion 63 and, hence to change the contrast of the picture on the screen 13A. In the particular embodiment shown, operating potential is applied to the dynodes 67 of the photomultiplier tube 31A from a voltage divider 68 which connects the ground line 34A of the cathode 66A to a junction point 73 supplied with a high D.C. voltage by any convenient means, now shown, such as the supply 32 of FIGURE 1. The anode 71 of the photomultiplier 31A receives operating potential through a dropping resistor 72 from junction point 73. The dynodes 67 connect to the voltage divider 68 in a conventional manner, so that dynodes spaced sequentially from cathode 66A to anode 71 of the photomultiplier tube are held at increasingly higher operating potentials by the voltage divider. The photomultiplier output line 36A extends from the junction point 69 to the input of a phase retaining amplifier 38A.

In the particular embodiment shown, the amplifier output line 41A connects to the junction point 59 in the receiver 51 and thence to the control grid 56 of picture tube 12A. The condenser lenses, photomultiplier 31A, amplifier 38A, and the line 41A connected to the control grid 56 constitute a feedback path 74A arranged to vary the brightness of spot S as a function of the light transmitted by the transparency.

To operate the apparatus 50, the television set 51 may be tuned to an unused television channel using the channel selector 76 thereof. Alternatively, the channel selector 76 may be turned to a broadcasting channel and the contrast control 61 may be adjusted for minimum contrast in order to prevent the broadcast video signal from appearing on the screen 13A. The purpose of either procedure is to eliminate unwanted broadcast video from the screen 13A. Thus, the screen is left with uninterrupted raster, that is, a spot S of light of consistent brightness moving horizontally across the screen 13A to described a vertically stacked set of bright horizontal lines. As in the apparatus 10 above described, the moving spot S of light on the screen 13A is focused by the lens 23A as scanning spot S′ on the face of the negative 27A at S′, the light transmitted by the negative being maximized when the beam is focused on a clear spot on the negative and minimized when the light beam is focused on a dark or dense spot on the negative and focused by the condenser lenses 28A and 29A on the cathode 66A of the photomultiplier tube 31A.

The incidence of light on the cathode knocks electrons therefrom in a known manner. The electrons thus freed are attracted successively to the several dynodes and finally to the anode 71, each succeeding dynode giving up more electrons than strike it in a known manner to multiply the electron current by the time it reaches the anode 71. Thus, the low transmission of light through a dark area on the negative results in low electron flow through the photomultiplier 31A and the anode 71 is maintained substantially at the high potential of the point 73. On the other hand, scanning of a clear spot in the negative 27A by the spot S′ increases electron flow through the photomultiplier 31A and, hence, reduces the potential of the anode 71.

As a result, the high potential on the photomultiplier anode 71 corresponding to scanning into a dark area on the transparency raises the potential of the picture tube control grid 56. This results in a larger voltage drop between the cathode 54 and the control grid 56 which increases the number of electrons in the cathode ray tube beam and, hence, increases the brightness of the light spot S on the screen 13A.

On the other hand, scanning into a clear spot on the transparency 27 increases both the light flow to the photomultiplier cathode 66A and the electron flow through the photomultiplier 31A so that the potential at the anode 71 drops. The low potential on the anode 71 is applied through junction point 69, line 36A, amplifier 38A, line 41A and junction point 59 to the control grid 56 of the cathode ray tube for decreasing the electron beam intensity in the cathode ray tube and, as a result, decreasing the brightness of the spot S on the screen 13A. The effect of the feedback path 74A is, therefore, as in the embodiment of FIGURE 1 to produce inversion of the light and dark areas of the transparency on the image appearing on the screen 13A, a negative image on the transparency 27A giving rise to positive image on the screen 13A.

In summary therefore, an intensification of the light falling on the photomultiplier tube 41A will through the feedback path 74A diminish the intensity of the light spot S on the screen 13A. Conversely, a decrease in photomultiplier illumination will increase the brightness of the light appearing on the cathode ray tube screen. Thus, path 74A functions as a negative feedback path as in FIGURE 1.

If desired, additional display devices, preferably conventional television sets 78 and 79, may be electrically connected to the line 41A in the same manner as the set 51 so that the output from the photomultiplier tube 31A will produce on the screens 81 and 82 of the sets 78 and 79 the same image as appears on the screen 13A of the set 51. In order to assure that the electron beams of the sets 51, 78 and 79 will energize phosphors at this same relative location on the screen 13A, 81 and 82 at the same moment, that is, to insure that the image appearing on the screen 13A will be correctly reproduced on the screens 81 and 82, the sets 51, 78 and 79 must be synchronized. This is easily achieved when the sets 51, 78 and 79 are conventional broadcast receivers by setting the channel selectors 76, 83 and 84 of the sets 51, 78 and 79, respectively, to the same broadcasting channel, here illustrated for example, by channel 2. The broadcasting station provides each of the sets with the same synchronizing signals and therefore assures that the electron beams on the several sets will move in synchronism so that the picture on each of the sets will be the same. Tuning of the contrast controls 62, 86 and 87 of the sets 51, 78 and 79 for minimal contrast will eliminate the broadcast picture from the screens of the sets leaving the screens clear to reproduce without interference the image presented thereto by the spot sensing device 21A. The extra sets 78 and 79 have no influence on the photomultiplier 31A and may be moved out of sight of the spot sensing device 21A to provide a closed circuit television system for reproducing the image of the transparency 27A.

Modification of FIGURE 3

FIGURE 3 discloses schematically a modified circuit 85 in which parts corresponding to parts of FIGURES 1 and 2 will carry the same reference numerals thereas with the suffix "B" added thereto. The circuit of FIGURE 3 differs from that of FIGURE 2 in that the output from the photomultiplier 31B is taken from one of the dynodes 67B thereof, preferably that nearest the anode 71B. More particularly, the voltage dropping resistance 72B preferably now appears between the output dynode 67B and the high voltage point 73B. The photomultiplier output is taken from point 69B between the dropping resistor 72B and the output dynode 67B and, as in FIGURE 2, applied through line 36B to the amplifier 38B. With this arrangement, the polarity output voltage appearing on line 36B will be reversed from that of FIGURE 2. More specifically, when the light intensity striking the cathode 66B rises the electron flow through the photomultiplier 31B rises. Since the output dynode 67B gives out more electrons than it gains from the preceding dynode, the output dynode becomes more positive as electron flow through the photomultiplier increases. Thus, the line 36B increases in potential as the light intensity falling on the photomultiplier cathode increases. If desired, a potentiometer 90 may be placed between the junction 69B and ground, the line 36B being fed from the slider of such potentiometer. Thus, adjustment of the slider adjusts the amplitude of the voltage fed through the amplifier 38B and thereby adjusts the contrast of the image appearing on the picture tube 12B so that, for example, an overly contrasting image could be reduced. It is fully contemplated that an automatic device of any conventional sort may be used to adjust the potentiometer 90 for automatically maintaining a given average screen image contrast level when a series of transparencies of differing contrast are run through the apparatus.

The circuit of FIGURE 3 also differs from the circuit of FIGURE 2 in that the line 41B connects to the cathode 54B of the cathode ray tube 12B rather than to the control grid as in FIGURE 2. As a result, an increase in potential on the line 41B raises the potential of the cathode 54B to a level near that of the control grid 56B thus reducing the potential difference therebetween and thereby reducing the electron beam intensity striking the screen 13B. Thus, the circuit of FIGURE 3 still produces a reduction in the intensity of the light spot on the screen 13B in response to an increase in the light falling on the cathode 56B of the photomultiplier 31B just as was the case in the circuit of FIGURE 2 and the feedback path 74B is still an inverse feedback path as in FIGURES 1 and 2.

Although it is preferred that the path 74B be a negative feedback path, as above described, it is contemplated that positive feedback may be used and may be acceptable in certain cases. For example, connection of the line 41B to the control grid 56B as in FIGURE 2, gives positive feedback through the line 41B so that the images on the screen 13B and transparency 27B would be of the same rather than opposite intensity. Positive feedback through the path 74B could also be obtained by maintaining the connection thereof to the cathode 54B as in FIGURE 3 and connecting the line 36B to the anode of the photomultiplier as in FIGURE 2. As a third alternative, positive feedback could also be achieved in the circuits of FIGURES 1, 2 and 3 by utilizing a phase inverting amplifier in place of the phase retaining amplifier 38B. Positive feedback through the path 74B does not, however, compensate for the image smearing effect of long persistence phosphors as does negative feedback as above described. Further, the stability of the negative feedback system is lacking. The regeneration resulting from positive feedback tends to produce a black and white image without shades of gray, any gray tones in the specimen tending to be reproduced on the screen as black. Thus, images of line drawings or similar high contrast patterns can be reproduced on the screen 13B by use of positive feedback circuit on the path 74B.

Inverse feedback from the photomultiplier tube to the cathode ray tube in the systems of FIGURES 1, 2 and 3 causes the contrast of the image on the cathode ray screen to approach as a maximum the image contrast of the scanned transparency. FIGURE 3 also discloses a contrast compensation circuit for increasing the contrast of the image on the screen beyond that of the transparency being scanned. In the circuit of FIGURE 3, a small, fast responding glow lamp 88 connects between the output of the maplifier 38B and ground. Thus, the light output of the glow lamp 88 will increase as the output amplitude of the amplifier 38B increases and hence as the light transmitted by the negative 27B to the cathode 66B increases. If desired, a condenser lens 89 may be disposed between the flow lamp 88 and the cathode 66B of the photomultiplier 31B. The light from the glow tube 88 is focused by the lens 89 on the cathode 66B and adds to the light transmitted by the negative 27B. Thus, the lamp 88 provides a further and positive feedback path connected in a loop which excludes the cathode ray tube 12B but which includes the photomultiplier 31B and, preferably, the amplifier 38B, the amplifier 38B being included to provide sufficient operating power for the glow lamp. The contrast compensation circuit of FIGURE 3 could also be used in the apparatus of FIGURES 1 and 2, if desired.

Modification of FIGURE 4

FIGURE 4 discloses a further embodiment of the invention. Portions of the apparatus of FIGURE 4 corresponding to portions of FIGURES 1, 2 and 3 will carry the same reference numerals thereas with the suffix "C" added thereto. FIGURE 4 discloses a photographic enlarger structure 95 in which an enlarger head 91 acts as the light spot sensing device and is supported on a fixed column 92. The enlarger head 91 may be conventional to the extent that it includes an objective lens 23C, bellows 93, a suitable holder 26C for a negative transparency 27C and condenser lenses 28C and 29C disposed in a housing 24C. The enlarger head 91 departs from conventional practice in being provided with a cross slide 94 located above the condenser lens 29C which is transversely slidable for alternatively positioning a photomultiplier tube 31C and a standard enlarger lamp 96 on the axis of the condenser lenses 28C and 29C.

The enlarger column 92 is carried by a suitable base 97 which supports a further cross slide 98 which is slideable transversely of the axis of the enlarger head 91. The base cross slide 98 carries a display device which is preferably a conventional television set 51C containing a cathode ray tube indicated in broken lines at 12C. The screen 13C of the tube 12C faces upwardly and may be brought into coaxial alignment with the enlarger head 91 by rightward movement of the cross slide 98 to its position shown. The cross slide 98 also carries a conventional enlarger easel 89 the upper face of which is preferably the height of the screen 13C and which can be placed in coaxial alignment with the head 91 alternatively of the screen 13C. When the photomultiplier tube 31C and screen 13C are aligned on the axis of the enlarger head 91, and connected through a negative feedback path schematically indicated by the broken line 74C, the image of the negative 27C will appear as a positive image on the screen 13C and the enlarger head 91 may be adjusted to change the focus and magnification of the positive image appearing on the screen 13C. Thereafter, the cross slides 94 and 98 may be moved to their leftwardmost positions to bring the standard enlarger lamp 96 and enlarger easel 99 into alignment with the enlarger head 91. Without further adjustment of the enlarger head, the negative image 13C may now be projected onto photosensitive paper mounted on the easel 99 by the lamp 96 in a conventional manner. A positive print may then be made by conventional photographic developing of the exposed paper, the size, light distribution and focusing of the image thereon being identical to the image formerly appearing on the screen 13C.

Although particular preferred embodiments of the invention have been disclosed above for purposes of illustration, it will be understood that modifications or variations thereof lying within the scope of the appended claims are fully contemplated.

The embodiments of the invention in which an exclusive property or privilege is claimed are defined as follows.

I claim:

1. In an apparatus for producing a display image from a transparency, the combination comprising:

a cathode ray tube having a surface thereon consisting only of long persistence phosphors, means on said cathode ray tube generating a light spot on said surface, means for scanning said light spot across said surface and means for controlling the intensity of said light spot;

means supporting said transparency at a location spaced from said surface;

objective lens means disposed between said transparency and said surface for focusing said traveling light spot on said transparency so that said light spot scans said transparency;

condenser means for focusing light transmitted by said transparency at a point;

a photomultiplier tube having the cathode thereof located at said point for producing an output which varies with the intensity of the light at said point;

means connecting a dynode electrode of said photomultiplier tube to the cathode of said cathode ray tube for varying the intensity of the electron beam of the cathode ray tube directly with the intensity of the transparency area illuminated by said light spot;

contrast compensation means responsive to said output for increasing the light applied to said photomultiplier tube as a positive function of the light transmitted by said transparency in order to increase the contrast of the image on said surface of said cathode ray tube;

whereby the exitation of said long persistence phosphors will be effectively controlled to eliminate undesirable smearing effects in the display image which will provide an effective output for accurately controlling the intensity of said spot.

2. The apparatus defined in claim 1, wherein said contrast compensation means includes a glow lamp responsive to said output of said photomultiplier tube located near said point for directing the light transmitted thereby onto said cathode for increasing the light applied to said photomultiplier tube as a positive function of the light transmitted by said transparency.

3. In an apparatus for producing a display image from a transparency, the combination comprising:

a cathode ray tube having a surface thereon consisting only of long persistence phosphors, means on said cathode ray tube generating a light spot on said surface, means for scanning said light spot across said surface and means for controlling the intensity of said light spot;

means supporting said transparency at a location spaced from said surface;

objective lens means disposed between said transparency and said surface for focusing said traveling light spot on said transparency so that said light spot scans said transparency;

condenser lens means for focusing light transmitted by said transparency at a point;

a photomultiplier tube having the cathode thereof located at said point for producing an output which varies with the intensity of the light at said point;

modulating means connected to said photomultiplier tube for feeding said output to said intensity control means so that the intensity of said spot varies as a function of the intensity of the light striking said photomultiplier tube;

a lamp and means supporting said lamp and said photomultiplier tube for alternative axial alignment with said objective lens means and said condenser lens means; and means defining a supporting easel for photosensitive paper and means supporting said easel and said cathode ray tube for alternative axial alignment with said objective lens means and said condenser lens means;

whereby alignment of said photomultiplier tube and said surface of said cathode ray tube with said objective lens means and said condenser lens means will permit a visual inspection of said transparency so that said transparency can be focused, magnified and viewed as a positive image on said surface prior to aligning said lamp and said easel with said objective lens means and said condenser lens means for the purpose of making a photographic enlargement.

4. In an apparatus for producing a display image from a transparency, the combination comprising:

a television broadcast receiver including a cathode ray tube having a surface thereon, means on said cathode ray tube generating a light spot on said surface, means for scanning said light spot across said surface and means for controlling the intensity of said light spot;

means supporting said transparency at a location spaced from said surface;

objective lens means disposed between said transparency and said surface for focusing said travelling light spot on said transparency so that said light spot scans said transparency;

condenser lens means for focusing light transmitted by said transparency at a point;

a photomultiplier tube having its cathode located at said point for producing an output which varies with the intensiy of the light at said point;

first signal transfer means connecting said photomultiplier tube to said intensity controlling means for applying said output of said photomultiplier tube to said intensity controlling means and for causing the intensity of said spot to vary as a function of the intensity of the light striking said photomultiplier tube;

a plurality of further television broadcast receivers each having a further cathode ray tube, all of said receivers being set to receive the same television broadcast signal, said broadcast signal including a picture signal and a synchronizing signal, said broadcast synchronizing signal synchronizing the scanning of all said receivers;

contrast control means on each receiver actuable for preventing said broadcast picture from appearing on said cathode ray tubes;

second signal transfer means connecting each of said further cathode ray tubes to said first signal transfer means between said photomultiplier tube and said intensity controlling means of said first mentioned cathode ray tube;

whereby an image on said transparency will appear in reversed tone on said further receivers as well as on said first mentioned receiver.

References Cited

UNITED STATES PATENTS

| | | | |
|---|---|---|---|
| 2,480,423 | 8/1949 | Simmon | 178—6.8 |
| 3,008,001 | 11/1961 | Reith | 178—6.8 |
| 3,049,590 | 8/1962 | Hooper | 178—6.8 |
| 3,249,691 | 5/1966 | Bigelow | 178—6.8 |
| 3,251,936 | 5/1966 | Berchtold | 178—6.8 |
| 3,340,360 | 9/1967 | Celio | 178—6.8 |
| 2,214,072 | 9/1940 | Biedermann | 178—6.8 |
| 2,523,328 | 9/1950 | Ranks | 178—6.8 |
| 3,364,815 | 1/1968 | Smith | 88—24 |

ROBERT L. GRIFFIN, Primary Examiner

JOSEPH A. ORSINO, Jr., Assistant Examiner

U.S. Cl. X.R.

250—205, 217; 355—68, 69